(12) United States Patent
Schoeb

(10) Patent No.: US 7,357,858 B2
(45) Date of Patent: Apr. 15, 2008

(54) FILTER APPARATUS

(75) Inventor: Reto Schoeb, Rudolfstetten (CH)

(73) Assignee: Levitronix LLC, Waltham, MA (US)

( * ) Notice: Subject to any disclaimer, the term of this patent is extended or adjusted under 35 U.S.C. 154(b) by 160 days.

(21) Appl. No.: 10/828,145

(22) Filed: Apr. 19, 2004

(65) Prior Publication Data

US 2004/0226871 A1  Nov. 18, 2004

(30) Foreign Application Priority Data

May 14, 2003  (EP)  ................................. 03101356

(51) Int. Cl.
*B01D 35/18* (2006.01)
(52) U.S. Cl. .................. 210/85; 210/86; 210/149; 210/186; 210/443; 210/416.1
(58) Field of Classification Search .................. 210/85, 210/86, 149, 184–186, 443, 748, 416.1; 55/490.1; 219/679, 688
See application file for complete search history.

(56) References Cited

U.S. PATENT DOCUMENTS

| | | | |
|---|---|---|---|
| 4,631,133 A | 12/1986 | Axelrod | |
| 5,191,184 A * | 3/1993 | Shin | ............................ 219/685 |
| 5,194,078 A | 3/1993 | Yonemura et al. | |
| 5,767,470 A | 6/1998 | Cha | |
| 5,853,579 A | 12/1998 | Rummler et al. | |
| 6,048,452 A | 4/2000 | Shades et al. | |
| 6,248,987 B1 * | 6/2001 | Feher et al. | ................. 219/687 |
| 6,471,853 B1 * | 10/2002 | Moscaritolo | .................. 210/85 |
| 6,863,184 B2 * | 3/2005 | Ochi et al. | ................... 210/443 |

FOREIGN PATENT DOCUMENTS

| | | |
|---|---|---|
| DE | 3024539 A1 | 4/1982 |
| EP | 0212396 A2 | 3/1987 |
| EP | 0469237 A1 | 2/1992 |
| FR | 2809786 A1 | 12/2001 |

* cited by examiner

*Primary Examiner*—Matthew O. Savage
(74) *Attorney, Agent, or Firm*—Townsend and Townsend and Crew, LLP

(57) ABSTRACT

A filter apparatus is provided for the filtering of substances from a fluid having a filter housing (2) which bounds a filter space (6) and which has an inlet (3) and an outlet (4) for the fluid to be filtered and having a filter element (5) which is provided in the filter space (6) and which is designed and arranged so that the filtering fluid can only flow through the filter element (5) from the inlet (3) to the outlet (4) of the filter housing (2) in operation, wherein a heating device (10) is provided for the heating of the fluid which includes a microwave source (11) in order to act on the fluid by microwaves.

13 Claims, 4 Drawing Sheets

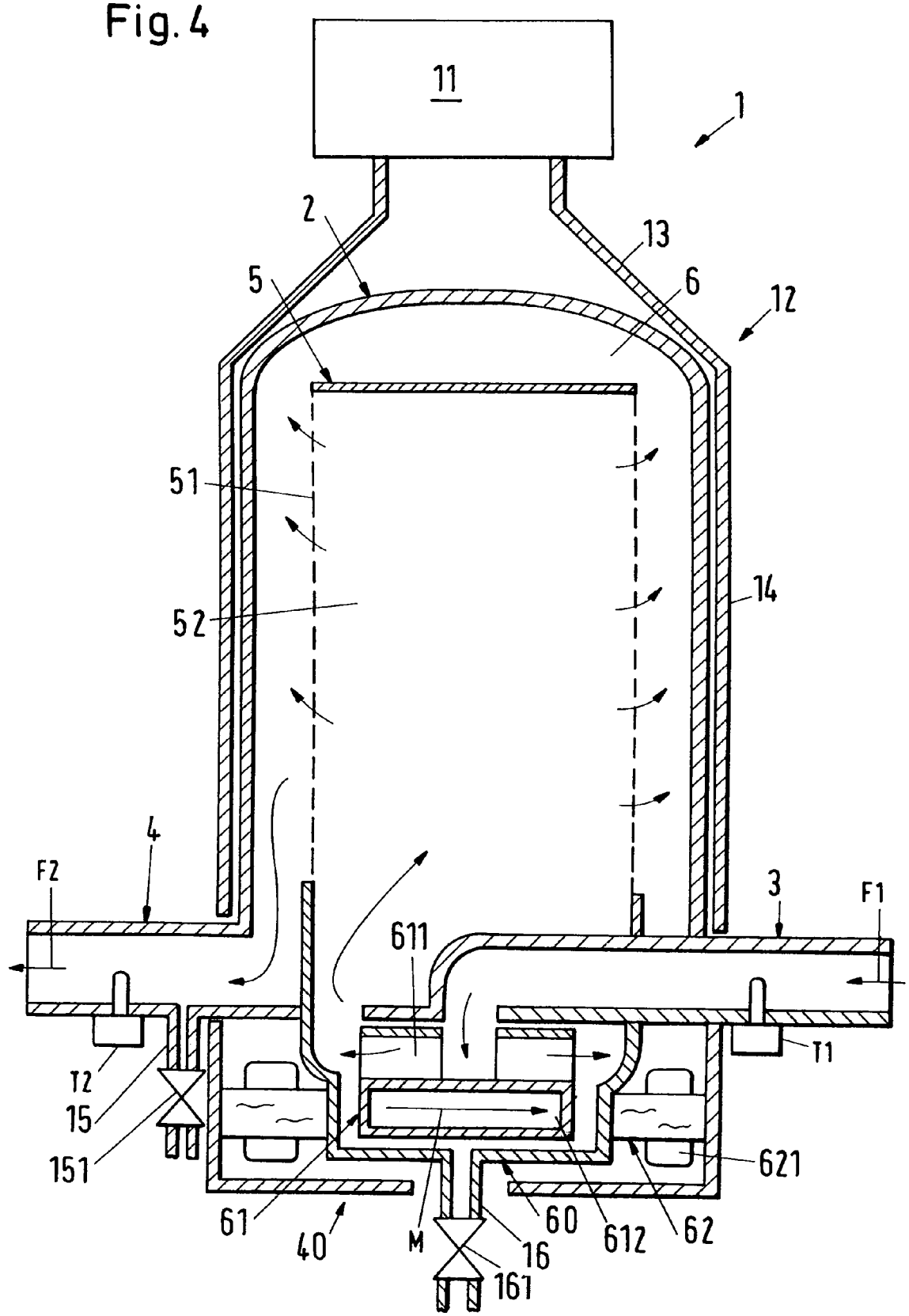

FILTER APPARATUS

BACKGROUND OF THE INVENTION

The invention relates to a filter apparatus for the filtering of substances from a fluid.

There is a need in many industrial processes to subject a fluid to filtering prior to its further use in order to remove unwanted contaminants from the fluid. The manufacture of semi-conductors and chips can be named as an example here. For example, the photoresists applied to the semi-conductor structures must satisfy the highest demands on cleanliness. Process filters are also necessary in the chemical-mechanical polishing (CMP) processes in which a suspension known as a slurry, typically made up of very fine solid particles and of a liquid, is applied to a rotating wafer and serves there for the polishing or lapping of the very fine semi-conductor structures, in order to remove any contaminants or clumps which may be present from the slurry. Such contaminants could cause substantial damage on the sensitive semi-conductor structures.

Such processes are frequently carried out in clean rooms of the highest category (class 1). Since these clean rooms are very cost-intensive, it is desirable to have apparatuses available which are as small and compact as possible and which have low space requirements.

Since the fluids used in semi-conductor production are frequently highly abrasive (e.g. slurry) or are chemically very aggressive, special materials are used for the process filters. The filter element or the filter membrane is frequently made of polytetrafluorethylene (PTFE, commercial name Teflon).

The perfluoroalkoxy copolymer (PFA) is frequently used for the manufacture of the filter housing and is characterized by its high chemical resistance with respect to aggressive substances and has the advantage in comparison with PTFE that it can be processed by means of injection molding processes.

In addition to filtering, it is also frequently a necessity in the processes to heat the fluid to a predetermined temperature or to regulate the temperature of the fluid in order to ensure optimum process management. It is, for example, known for this purpose to bring the PFA housings which contain the fluid or through which the fluid flows into thermal contact with a heat carrier according to the principle of a heat exchanger. Since, however, PFA is a poor heat conductor, such heating systems come with the disadvantage of a high thermal time constant. This thermal inertia makes a regulation of the temperature at least very difficult.

It is furthermore known to use infrared radiation for the heating of the fluids. However, for this purpose, an optical access to the fluid is necessary. It is, for example, possible to arrange a plurality of glass tubes around an infrared source and to allow the fluid to flow through these glass tubes in which the fluid can then be acted on by infrared radiation. This method can, however, not be used for very corrosive liquids such as hydrofluoric acid (HF) because such liquids attack the glass.

SUMMARY OF THE INVENTION

Starting from this prior art, it is therefore an object of the invention to provide a filter apparatus which is also suitable for abrasive and/or aggressive fluids and also makes an efficient heating of the fluid possible. Specifically the apparatus should be suitable for use in semi-conductor technology and for clean room applications, for example in the field of medical technology.

In accordance with the invention, a filter apparatus is therefore provided for the filtering of substances from a fluid having a filter housing which bounds a filter space and which has an inlet and an outlet for the fluid to be filtered as well as having a filter element provided in the filter space which is designed and arranged so that the fluid to be filtered can only flow through the filter element from the inlet to the outlet of the filter housing in the operating state, with a heating device being provided for the heating of the fluid which includes a microwave source to act on the fluid with microwaves.

The heating of the fluid by means of microwaves represents an extremely efficient and less expensive measure to bring the fluid—typically containing water—to the desired temperature. No physical or thermal contact with the fluid is required and heat carriers are also not necessary. The energy required for the heating of the fluid is introduced into the fluid directly by the microwaves. A very short thermal time constant results from this direct energy coupling so that a temperature regulation can be realized a lot easier and better with the filter apparatus in accordance with the invention. In addition, the materials typically used for filter apparatuses such as the high temperature polymers PTFE and PFA are largely transparent in the microwave range; that is, they have only a low absorption capability, if at all, for microwaves.

Microwave sources such as a betatron or a magnetron are today available at a very favorable price. They are very compact considering the power which can be achieved with them and thus allow an extremely space-saving design of the filter apparatus in accordance with the invention, which is in particular an advantage with respect to applications in the clean room.

To prevent an unwanted escape of the microwaves into the environment, a waveguide can be provided which substantially restricts the propagation of the microwaves to the filter space. It is, for example, possible for the filter apparatus to have an outer casing as a waveguide which is designed as a perforated plate, as a metallic grid or as a mesh so that it screens the outer space from the microwaves. It is furthermore possible to provide the filter housing with a conductive layer at its outer and/or inner surface for the screening. This layer can consist of a lacquer or of a metallic lacquer. The layer can be vapor deposited or deposited or generated on the surface of the filter housing by means of methods known per se.

In accordance with a preferred embodiment, the filter element has an inner space which is surrounded by a filter membrane. The microwaves can be introduced into the filter space from the outside with respect to the filter element.

In accordance with another embodiment, the microwaves are introduced into the filter space from the inside of the filter element. The filter element is, for example, designed substantially cylindrically, with the filter membrane being provided on the jacket surface of the cylinder. The microwaves can then be introduced into the inside of the filter element in order to propagate from there to the outside in the whole filter space. This has the advantage that the fluid itself serves as a screen for the microwaves, because the fluid absorbs the microwaves. A metallic outer casing is then no longer necessary.

It is in particular advantageous with respect to a temperature regulation for sensors to be provided to determine the temperature of the fluid at the inlet and the temperature of the fluid at the outlet. This measure furthermore has the advantage that the flow can be determined from these two temperatures.

Since some of the materials used for filter housings, for example PFA, have a low absorption capability in the microwave range and can therefore heat up under the action of the microwaves, the filter space should always be completely filled with fluid during operation to avoid local overheating of the filter housing. It is therefore advantageous for the filter apparatus to be provided with a level sensor to monitor the level of the filter space.

A monitor is preferably provided which prevents the filter space being acted on by microwaves if the filter space is not completely filled with fluid. The monitor can, for example, deactivate the microwave source on detection of a filter space not completely filled with fluid.

The filter apparatus in accordance with the invention can also advantageously be provided with a pump device for the conveying of fluid from the inlet to the outlet. An extremely compact apparatus can be realized in this manner which can carry out the three functions of filtering, heating and pumping. The pump device is preferably integrated into the inlet of the filter apparatus. The pump device is advantageously releasably connected to the rest of the filter apparatus to allow a simple replacement of the filter element.

It is advantageous with respect to an extremely compact, space-saving and high-powered embodiment for the pump device to include a rotary pump which has an integral rotor and which is designed as a bearingless motor.

The filter element is preferably designed as a replaceable filter cartridge.

For applications in the semi-conductor area or for medical applications, the filter element can in particular have a separation limit which amounts to less than ten micrometers, preferably at most 100 nanometers.

The filter housing preferably substantially consists of a ceramic material or of a polymer, in particular of perfluoroalkoxy copolymer (PFA), or of polytetrafluorethylene (PTFE) or of polyvinylidene fluoride (PVDF) or of polypropylene (PP). The filter apparatus is thereby also suitable for problematic fluids, for example abrasive fluids such as slurry, aggressive or chemically very reactive substances, corrosive substances such as acid, and in particular hydrofluoric acid.

It is furthermore advantageous for a control device to be provided which includes means for the determination of the flow with the help of the difference from the temperature of the fluid at the outlet and the temperature of the fluid at the inlet. The flow through the filter apparatus can thus be determined without any larger apparatus effort.

The invention will be explained in more detail in the following with reference to embodiments and to the drawing.

BRIEF DESCRIPTION OF THE DRAWINGS

FIG. 4 shows a further embodiment of a filter apparatus in accordance with the invention in which a pump device is provided.

DESCRIPTION OF THE PREFERRED EMBODIMENTS

Figure 1:
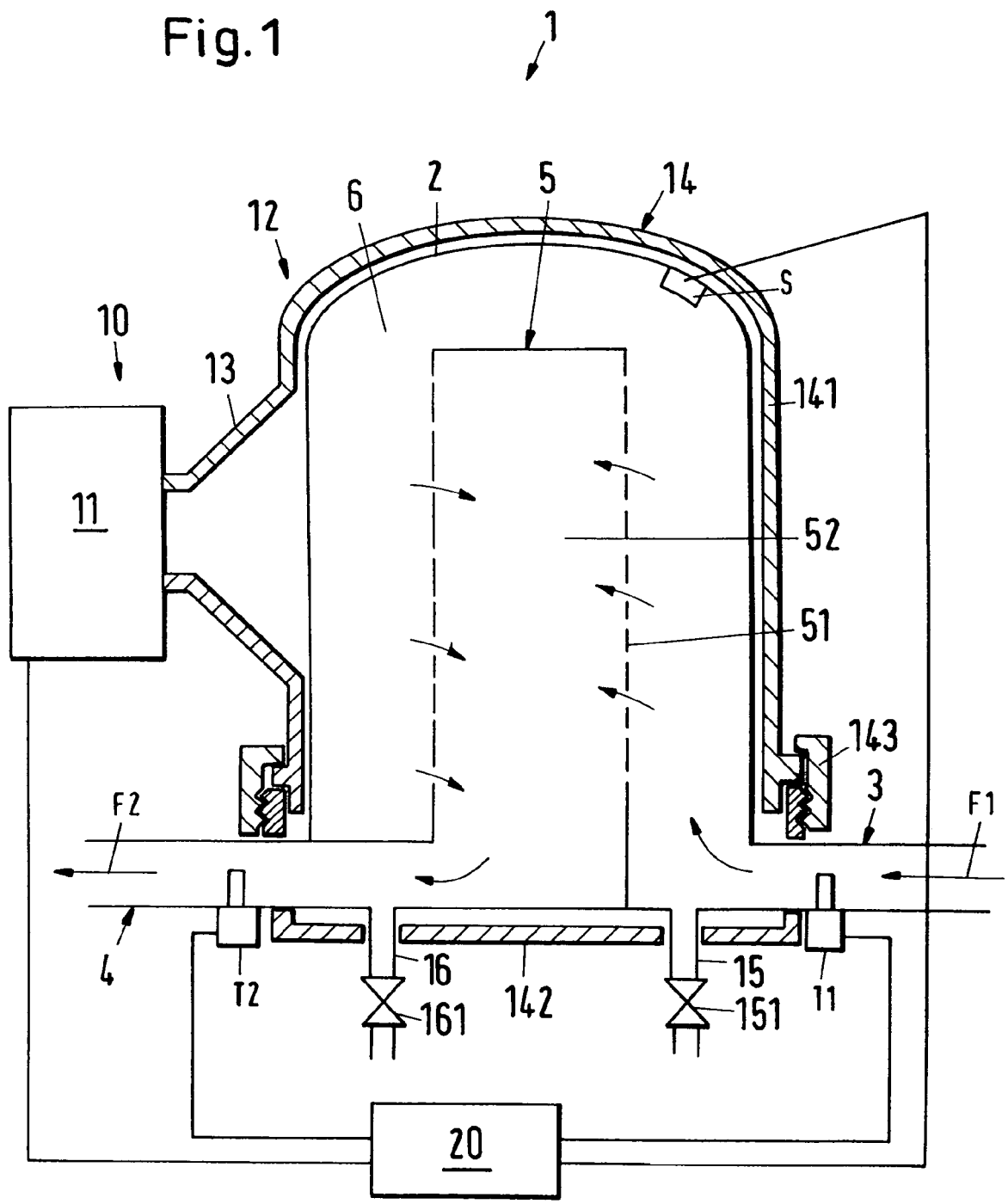
FIG. 1 shows a first embodiment of a filter apparatus in accordance with the invention.

FIG. 1 shows in a schematic, partly sectioned representation a first embodiment of a filter apparatus in accordance with the invention which is designated overall by the reference numeral 1.

Reference is made in the following by way of example to an application particularly important for practice, namely that the filter apparatus 1 is used in a production process in the semi-conductor industry, for example as a process filter in a CMP (CMP: chemical-mechanical polishing) process. In these processes, a suspension known as a slurry of fine solid particles in a liquid is applied to a rotating wafer and there serves for the lapping or polishing of the very fine semi-conductor structures. To prevent damage to the wafers or the penetration of unwanted substances, clumps and contaminants must be filtered out of the slurry in a prior process. The fluid to be filtered is therefore slurry in this case. The filter apparatus in accordance with the invention is, however, also suitable for other process liquids such as photoresist.

The filter apparatus 1 includes a filter housing 2 which bounds a filter space 6. The filter housing 2 has an inlet 3 through which the fluid can be introduced into the filter apparatus 1 as well as an outlet 4 through which the filtered fluid is led off. A filter element 5 is provided in the filter space 6 and is shown only schematically. The filter element 5 is here designed in a manner known per se as a replaceable filter cartridge. The filter element 5 has a substantially cylindrical shape. A filter membrane 51 is provided at the jacket surface of the cylinder and bounds an inner space 52 of the filter element 5. The filter element 5 is arranged so that the fluid to be filtered can only flow through the filter element 5 from the inlet 3 to the outlet 4 in the operating state. As the arrows in FIG. 1 indicate, the fluid flows through the inlet (arrow F1) into that part of the filter space 6 which is located outside the cylindrical filter element 5. Subsequently, the fluid flows through the filter membrane 51 from the outside to the inside, as the arrows without reference numerals indicate, and enters into the inner space 52 of the filter element 5. The substances to be filtered are retained by the filter membrane 51. The inner space 52 of the filter element 5 is in flow communication with the outlet 4 so that the fluid can flow out of the inner space 52 through the outlet 4 (arrow F2) out of the filter apparatus 1.

It is also possible to swap the inlet 3 and the outlet 4. Then the unfiltered fluid is introduced into the inner space 52 of the filter element 5, flows through the filter membrane 51 from the inside to the outside and is subsequently led off out of the filter space 6 (see e.g. FIG. 4).

The filter apparatus in accordance with the invention is in particular characterized in that a heating device 10 is provided which includes a microwave source 11 in order to act on the fluid with microwaves. A commercially available betatron or any apparatus otherwise known per se for the generation of microwaves serves, for example, as the microwave source 11. The microwaves usually have a frequency of some gigahertz, for example 2.5 GHz. The microwaves are led from the microwave source 11 by means of a waveguide 12 to the filter space 6 where they act on the fluid.

The waveguide 12 in this embodiment includes a metallic funnel 13 which is connected to the microwave source 11, on the one hand, and opens onto the filter housing 2, on the other hand. The waveguide 12 further includes a casing 14 which surrounds the filter housing 2 so that the outer space of the filter apparatus 1 is screened from the microwaves. The propagation of the microwaves is thus substantially restricted to the filter space 6. The funnel 13 merges into the casing 14. The casing 14 includes a dome-shaped upper part 141 and a base 142 which are releasably connected to one another, for example by means of a screw connection 143. The filter housing 2 is arranged inside the casing 14. The waveguide 12, that is, the funnel 13 and the casing 14, are designed so that they screen their outer space from the microwaves from the microwave source 11. For this purpose, the waveguide 12 can be designed as a perforated plate, a metallic grid or as a mesh or as a metallic housing. It is also possible to apply or attach the waveguide 12 to the inner and/or outer surface of the filter housing 2 as a layer, for example made of a lacquer, of a metallic lacquer or of a material otherwise suitable for the screening of microwaves.

The filter housing 2 is preferably made of a ceramic material or of a polymer, in particular of a perfluoralkoxy copolymer (PFA). Other polymers, in particular high temperature polymers such as polytetrafluorethylene (PTFE) or polyvinylidene fluoride (PVDF) or polypropylene (PP) are also suitable for the filter housing 2. The material for the filter housing 2 should be selected so that it is not attacked by the fluid to be filtered, so that it permanently withstands the desired process temperature and has at most a low absorption capacity for the microwaves used. PFA has the advantage that it is both excellently resistant to aggressive, abrasive and corrosive fluids and can be processed in injection molding processes. The latter has the advantage of simple production.

The filter apparatus 1 furthermore includes two sensors T1, T2 for the temperature detection. The sensor T1 is arranged in the region of the inlet 3 so that the temperature of the fluid on the entry into the filter apparatus 1 can be determined with it. The sensor T2 is arranged in the region of the outlet 4 so that the temperature on the exiting from the filter apparatus 1 can be determined with it. In addition, a level sensor S is provided with which the level of the filter space 6 can be detected. In particular, a check can be made by means of the level sensor S as to whether the filter space 6 is completely filled with fluid. The three sensors T1, T2, S are connected by signal to a control device 20 as is indicated in FIG. 1 by the leads without reference numerals.

The control device 20 is also connected by signal to the microwave source 11 and controls the microwave source 11 in operation.

Two vent openings 15 and 16 are provided for the venting of the filter space 6 and can each be opened and closed by a stop member 151 or 161 respectively. The vent opening 16 is connected to the inner space 52 of the filter element 5 and thus serves for the venting of the filter space 6 at the outlet side. The vent opening 15 is connected to the part of the filter space 6 located outside the filter element 5 and thus serves for the venting of the filter space 6 at the inlet side. Gas bubbles present in the filter space 6 can be removed by means of the vent openings 15, 16.

During operation, the fluid to be filtered is conveyed through the filter apparatus 1 by means of a pump device not shown in FIG. 1. The fluid flows through the filter apparatus 1 in the manner already described above, with the substances to be filtered being kept back by the filter membrane 51. The fluid can be heated to a pre-settable temperature in the filter space 6 by being acted on by microwaves. On flowing through the filter membrane 51, eddies and strong turbulence are formed in the fluid which have the advantageous effect that the temperature of the fluid is homogenized faster and better.

A check is made by means of the level sensor S as to whether the filter space 6 is completely filled with the fluid. Since PFA, for example, has the property of absorbing microwaves to a low degree, the filter space 6 should always be completely filled during operation so that local overheating of the filter housing 2 cannot occur. The level sensor S can, for example, be a capacitive sensor which determines with reference to the change of the capacity that the filter space is not completely filled with fluid.

A monitor is preferably provided which prevents the acting on of the filter space 6 by microwaves if the filter space 6 is not completely filled with fluid. In this embodiment, the monitor includes the level sensor S as well as a locking electronic system connected thereto by signal and is integrated, for example, in the control device 20. If the filter space 6 is not completely filled with fluid, the locking electronic system immediately deactivates the microwave source 11 so that the filter space 6 is not acted on by microwaves. The locking electronic system can also be designed so that the microwave source 11 can only be activated when a signal from the level sensor S is present that the filter space 6 is completely filled.

A spatially very homogeneous heating is ensured when the microwaves act directly on the fluid. The risk of the formation of gas bubbles or vapor bubbles in the fluid is thereby drastically reduced. The formation of bubbles is a disadvantage because as a rule they settle at one of the surfaces and then cooling no longer takes place by the fluid there. This results in the formation of hot spots which can lead to local overheating.

The microwave source 11 is controlled by the control device 20. The energy or power output of the microwave source is preferably controlled or set by means of pulse width modulation (PWM). The energy output of the microwave source 11 is set and coordinated with the throughflow (mass flow rate) of the fluid so that the desired temperature increase can be achieved, on the one hand, and no overheating occurs, on the other hand. The power output of the microwave source 11 is preferably optimized so that no vapor bubbles are produced with a minimum dwell time of the fluid in the filter space volume.

The temperature of the fluid at the inlet 3 and at the outlet 4 is detected by a technical measurement by means of the sensors T1 and T2 during operation and is transmitted to the control device. Detecting both temperatures has the advantage that the throughflow through the filter apparatus 1 can also be determined. This can take place as follows, for example. The power output by the microwave source 11 is pre-settable or determinable. Furthermore, the following parameters are known or can be determined: the volume of the fluid space 6, and thus the fluid volume in the filter space 6; the specific thermal capacity of the fluid; and the thermal capacity of the filter apparatus. The temperature increase achieved with the known performance of the microwave source 11 results from the difference of the temperature of the fluid at the outlet 4 and at the inlet 3. When taking the thermal capacity of the filter apparatus 1 into account, the volume of fluid which has undergone this temperature increase can then be determined by means of the specific thermal capacity. The throughflow of the fluid through the filter apparatus 1 results from this. The filter apparatus 1 in accordance with the invention can thus also be used as a flow sensor for the determination of the fluid flow.

The evaluation means for the determination of the throughflow are integrated, for example, in the control device 20. The throughflow of the fluid, that is, the mass of fluid per time, can thus be determined from the difference of the temperature of the fluid at the outlet 4 and the temperature of the fluid at the inlet 3 and the power output by the microwave source 11. It is thus also possible to regulate the throughflow.

As already mentioned above, the microwave source 11 is preferably controlled by means of pulse width modulation;

that is, the microwave source 11 is operated at a constant power and the power output by it is determined or regulated via the time switched on.

A short thermal time constant results by the direct action of the microwaves on the fluid to be heated; that is, the system of heating device 10 and fluid to be heated has a low thermal inertia. This is in particular a large advantage with respect to a regulation of the outlet temperature of the fluid. To regulate the temperature of the fluid at the outlet 4 to a pre-settable desired value, it is, for example, possible to pursue the following procedure. The temperature of the fluid at the outlet 4 is determined as the actual value by means of the sensor T2. The actual value is compared to the desired value. The difference temperature, by which the actual value differs from the desired value, results from this comparison. With a known throughflow, a known volume of the filter space 6 and known thermal capacities of the fluid and of the filter apparatus 1, the power can then be determined which has to be supplied to the fluid to reach the desired temperature at the outlet 4. The microwave source 11 is then controlled by the control device 20 so that it emits the corresponding power in the form of microwaves. On the PWM control of the microwave source 11, the power of the microwave source 11 is regulated over the time during which the microwave source 11 is switched on.

The temperature of the fluid at the outlet can also be regulated using known regulating methods without the explicit determination of the required power.

The choice of the material for the filter membrane 51 and the pore size of the filter membrane 51, which defines the separation limit, depend on the application. The separation limit means the size of the particles which are retained by the filter membrane 51. The term "filter membrane" also means screens, metal screen sheets or mesh-like structures for filtering.

In the case of applications in the semi-conductor industry, for example in CMP processes or in the filtering of photoresists, high temperature polymers are frequently used as the material for the filter membrane 51. Examples here are PTFE and PVDF. The pore size is oriented on the fineness of the desired filtering. It can, for example, lie in the micrometer range and amount to 10-50 micrometers. However, even smaller pore sizes can be chosen for very fine filtering procedures. The separation limit can amount to 100 nanometers or even less.

Filter membranes 51 made of other materials, such as, for example, other plastics, composite materials, ceramic materials or ceramically coated substances, can also be used. The material should be chosen so that it does not have any screening or absorbing properties for microwaves which are too high. The filter membranes can be made so that foils or thin material layers are punched out, drilled, lasered, perforated with an electron beam or cut by water jet, with other techniques generally also being possible.

It is not necessary for the filter element to be designed substantially cylindrically or to have an inner space at all. The filter element can e.g. also be designed as a planar membrane or as a planar screen.

Figure 2:
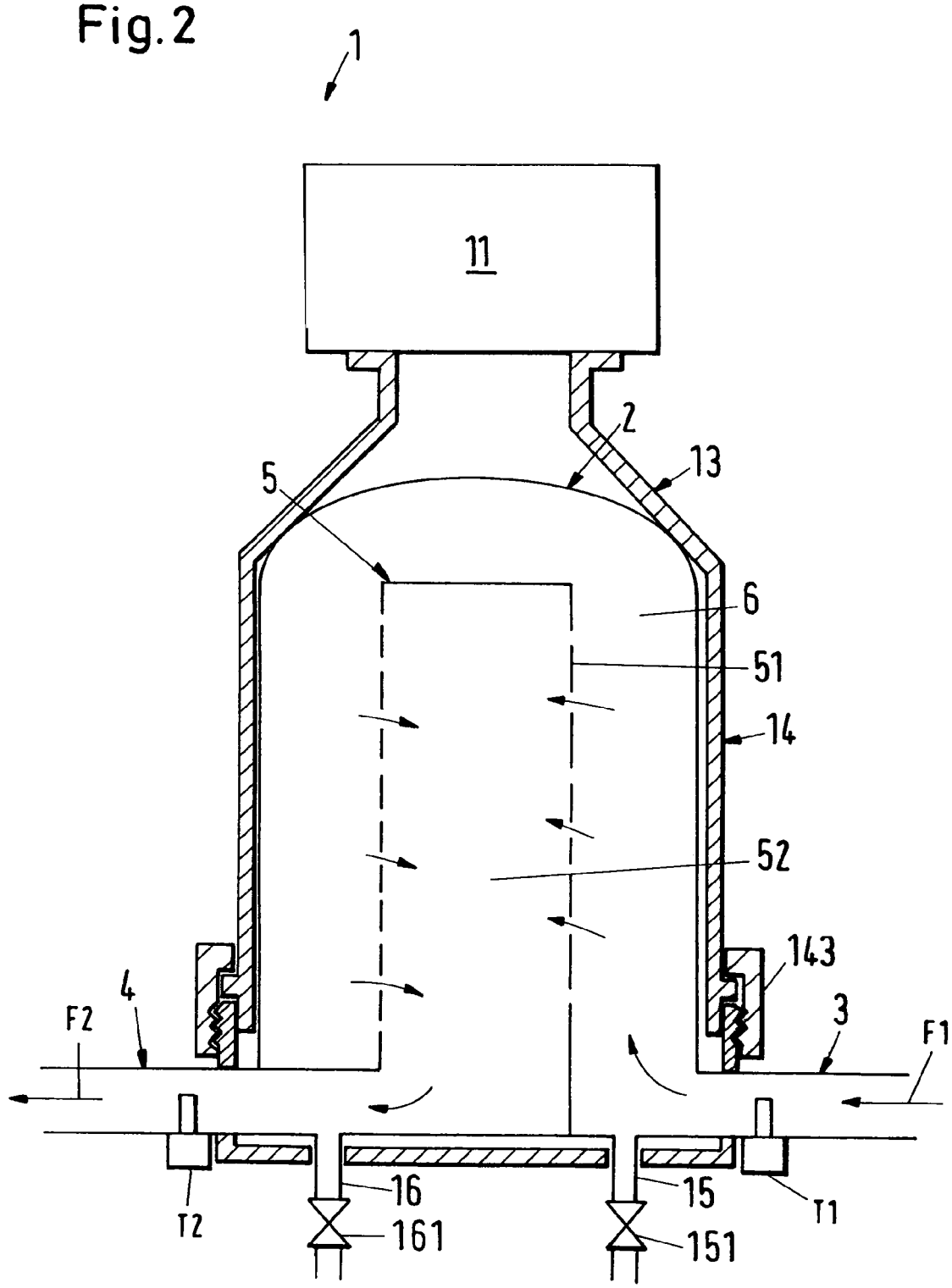
FIG. 2 shows a variant of the first embodiment.

FIG. 2 shows, in a representation analogue to FIG. 12, a variant of the first embodiment. The reference symbols have the same meaning as in FIG. 1. The control device 20 is not shown. In the variant shown in FIG. 2, the microwave source 11 is placed at another position, namely—according to the representation—above the filter housing 2. The funnel 13 is matched with respect to its angle of opening to the upper end of the filter housing 2 so that the upper end of the filter housing 2 in accordance with the representation projects into the funnel. A spatially still more homogeneous penetration of the filter space 6 by microwaves can be achieved by this measure.

A large variety of other variants are possible where the microwave source 11 can be placed relative to the filter housing. Depending on the application and on the design, the positioning of the microwave source 11 and/or the design of the waveguide 12 can be optimized to ensure a coupling of the microwave energy into the filter space which is as good and as homogeneous as possible.

It is understood that more than one microwave source can also be provided. Two microwave sources can, for example, be provided lying opposite one another, or a plurality of microwave sources can be arranged around the periphery of the filter housing 2.

Figure 3:
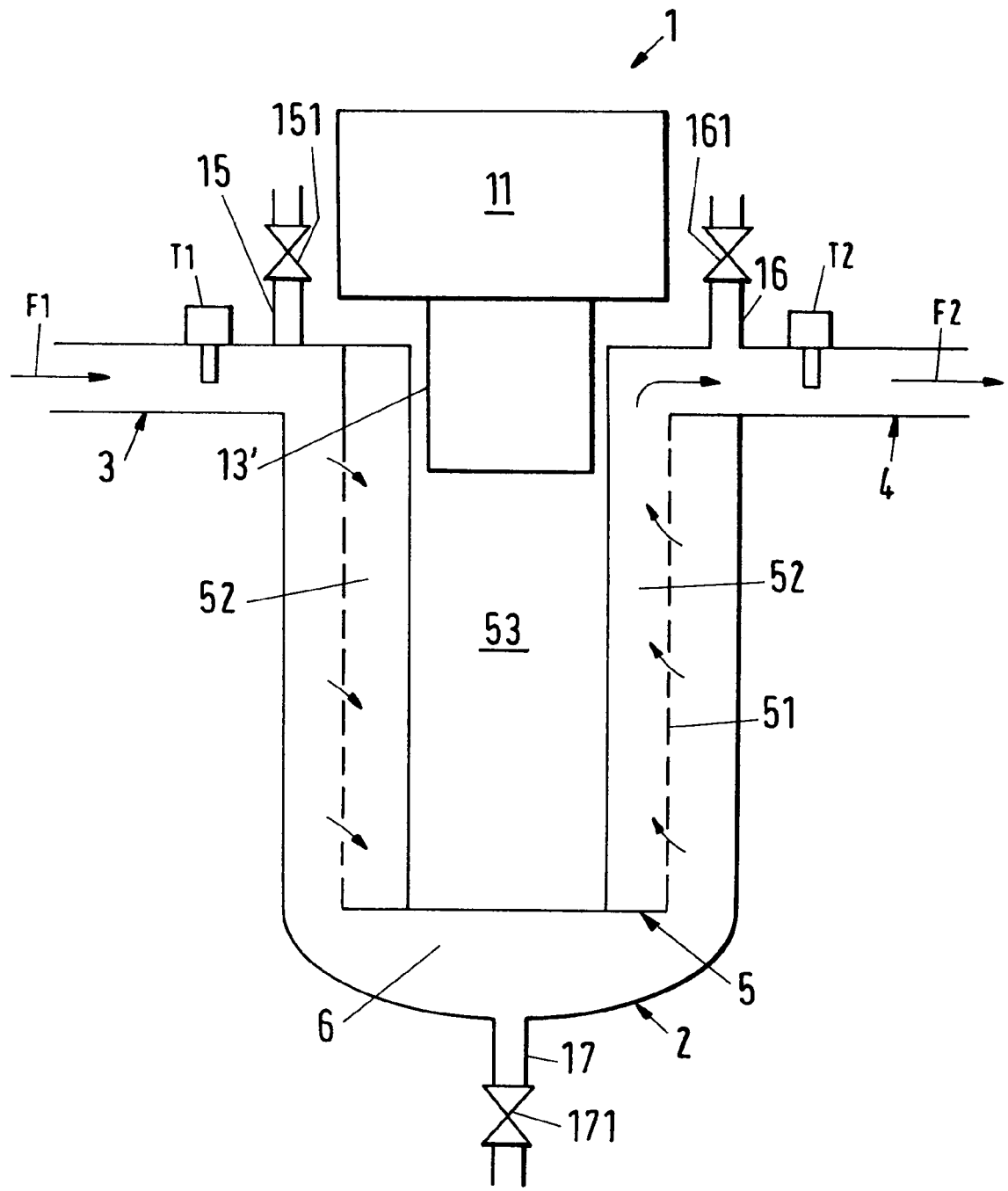
FIG. 3 shows a second embodiment of a filter apparatus in accordance with the invention.

FIG. 3 shows a second embodiment of the filter apparatus 1 in accordance with the invention. In the following, only the differences from the first embodiment will be looked at. Otherwise, the explanations of the first embodiment apply equally to the second embodiment.

In the second embodiment, the microwave source 11 is arranged so that the microwaves can be introduced from the interior of the filter element 5 into the filter space 6.

The inner space 52 of the filter element 5 is designed as a cylindrical ring space which surrounds a central recess (or leadthrough) 53 into which the fluid cannot penetrate.

Instead of the funnel 13, a tubular guide element 13' is provided whose one end is connected to the microwave source 11 and whose other end is arranged in the central recess 53. In this manner, the microwaves generated by the microwave source 11 are guided into the interior of the filter element 5 and from there permeate through the whole filter space 6. This measure has the advantage that the fluid to be heated itself serves as a screen which absorbs the microwaves and effectively prevents an exiting of the microwaves into the outer space or into the environment. It is consequently no longer necessary to provide a separate screen arranged outside the filter housing 2. The casing 14, which was provided in the first embodiment (see FIG. 1), can be dispensed with in the second embodiment.

The microwave source 11 is arranged directly at the filter element 5. If the dimensions or the space circumstances allow, it is also possible to arrange the microwave source 11 itself at the interior of the filter element 5, that is, for example, in the central recess or leadthrough 53. It is also possible to provide more than one microwave source 11 in the second embodiment.

In the second embodiment (FIG. 3), the filter device is shown in a different position of use from FIGS. 1 and 2. In addition, another outflow 17 is provided at the lowest point of the filter housing 2 in accordance with the illustration in order to drain fluid from the filter space. The outflow 17 is provided with a stop member 171 for opening and closing.

FIG. 4 shows a further embodiment of a filter apparatus in accordance with the invention in which a pump device 40 is provided to convey the fluid through the filter apparatus 1. To achieve a design of the filter apparatus 1 which is as compact as possible, the pump device is integrated into the region of the inlet 3.

The explanations with respect to the first and to the second embodiments apply in analogously the same manner to the embodiment shown in FIG. 4. The reference numerals have the same meanings as have already been explained. Only the changes and differences will be dealt with in the following.

In the embodiment shown in FIG. 4, the inlet 3 and the outlet 4 have been swapped in comparison with the representations in FIGS. 1-3; that is, in the embodiment in accordance with FIG. 4, the fluid is introduced into the inner space 52 of the filter element 5, flows through the filter membrane 51 from the inside to the outside and then leaves the filter space 6 through the outlet 4 as filtered fluid. This is indicated in FIG. 4 by the arrows without reference numerals.

The pump device 40 is arranged beneath the filter element 5 at the filter housing 2 in accordance with the illustration and inside the casing 14. The pump device 40 is releasably connected to the filter housing 2 so that it can be released from the filter housing 2 without problem, for example to replace the filter element 5.

The pump device 40 preferably includes a rotary pump 60, because rotary pumps allow high conveying powers, on the one hand, and make a continuous conveying possible, on the other hand, which has an advantageous effect on a heating of the fluid which is as homogeneous as possible. In addition, rotary pumps have no membranes which can be attacked by very abrasive or aggressive substances.

The rotary pump 60 includes a rotor 61 on which a plurality of blades 611 are provided for the conveying of the fluid.

The rotary pump 60 further includes a stator 62 with a stator winding 621 to drive the rotor 61. The control and steering devices for the rotary pump 60 are not shown in FIG. 4 for reasons of clarity.

The rotary pump 60 in particular preferably has a completely magnetically supported rotor 61 for such fluids which contain solid particles (e.g. slurry) or which are very pure; that is, the rotor 61 is magnetically supported in a contact-free manner with respect to the stator 62. The absence of mechanical bearings for the rotor 61 has a plurality of advantages. The problem is thus avoided that abrasive particles can damage mechanical bearings. Furthermore, there is no risk of contamination of the fluid by lubricating means or bearing wear. Sealing problems are also avoided.

It is particularly simple and energetically favorable from an apparatus aspect for the rotor 61 to be permanently magnetic. For this purpose, the rotor 61 includes a permanent magnet 612. The magnetization of the permanent magnet is represented in FIG. 4 by the arrow with the reference symbol M.

A particularly preferred rotary pump 60 is disclosed e.g. in EP-A-0 819 330 or U.S. Pat. No. 6,100,618. This rotary pump has a so-called integral rotor and is designed as a bearing-free motor. The term "integral rotor" means that the pump rotor and the rotor of the motor driving the pump are identical. The rotor 61 functions both as the rotor of the motor drive and as the rotor of the pump. The term "bearing-free motor" means that the rotor is completely magnetically supported, with no separate magnetic bearings being provided. The stator 62 is both the stator of the electrical drive and the stator of the magnetic support. For this purpose, the stator winding 621 includes a drive winding of a number of pairs of poles p and a control winding of the number of pairs of poles p±1. It is thus possible both to drive the rotor 61 and to support it magnetically in the stator in a completely contact-free manner. Reference is made to the documents already cited here with respect to further details of such a rotary pump.

During operation, the stator winding 621 controlled by the control and steering device (not shown) generates a drive rotary field which brings about a torque on the rotor 61 and sets it into rotation. Furthermore, the control winding of the stator winding 621 generates a magnetic control field with which the position of the rotor 61 with respect to the stator 62 can be regulated.

The fluid is sucked through the inlet 3 by the rotation of the rotor 61 and is conveyed through the filter membrane 51 to the outlet 4. The fluid can, as described above, be heated to a pre-settable temperature in the filter space 6 by means of the microwaves generated by the microwave source 11.

The embodiment shown in FIG. 4 represents an extremely compact apparatus which can carry out four functions, namely the filtering of substances from the fluid, the conveying of the fluid through the filter apparatus, the heating or the regulating of the fluid to a pre-settable temperature, and the determination or the regulation of the flow of the fluid.

Due to the very compact and space-saving design, the filter apparatus in accordance with the invention is in particular also suitable for such applications where a low space requirement is desirable. These are, for example, applications in clean rooms of all purity categories or purity classes. In particular the clean rooms of the highest purity class are very cost-intensive so that a space requirement of the apparatuses used which is as small as possible has a great advantage.

The filter apparatus in accordance with the invention is in particular suitable for processes in the semi-conductor industry, in the manufacture of chips or ICS, for example as process filters in CMP processes.

The filter apparatus in accordance with the invention is also suitable for all processes in which high demands have to be made on the purity, for example in the fields of medicine, medical engineering, pharmaceutics, food industry or for processes in which work is carried out with chemically very aggressive fluids.

The invention claimed is:

1. A filter apparatus for the filtering of substances from a fluid comprising a filter housing that is transparent to microwaves, is made of a ceramic material or of a polymer material, that bounds a filter space and has an inlet and an outlet for the fluid to be filtered, a casing surrounding the filter housing, a filter element which is provided in the filter space and which is designed and arranged such that the filtering fluid can only flow through the filter element from the inlet to the outlet of the filter housing in operation, and a heating device for heating the fluid which includes a microwave source in order to act on the fluid by microwaves, the casing including a waveguide for directing microwaves from the microwave source for heating the fluid within the filter housing, wherein said filter space is separated from said casing and said microwave source by said housing.

2. An apparatus in accordance with claim 1, in which the waveguide substantially restricts the propagation of the microwaves to the filter space.

3. An apparatus in accordance with claim 1, in which the filter element has an inner space which is surrounded by a filter membrane.

4. An apparatus in accordance with claim 1, in which sensors are provided to determine the temperature of the fluid at the inlet and the temperature of the fluid at the outlet.

5. An apparatus in accordance with claim 1 having a level sensor for the monitoring of the level of the filter space.

6. An apparatus in accordance with claim 1 having a monitor which prevents microwaves from acting on the filter space if the filter space is not completely filled with fluid.

7. An apparatus in accordance with claim 6, wherein the pump device includes a rotary pump which has an integral rotor and which is designed as a bearing-free motor.

8. An apparatus in accordance with claim 1 having a pump device for the conveying of the fluid from the inlet to the outlet.

9. An apparatus in accordance with claim 1, wherein the filter element is designed as a replaceable filter cartridge.

10. An apparatus in accordance with claim 1, wherein a control device is provided which includes means for the determination of a flow rate with the help of a difference from a temperature of the fluid at the outlet and a temperature of the fluid at the inlet.

11. A filter apparatus for filtering substances from a fluid comprising a filter for the fluid, a housing for the filter including an inlet and an outlet for flowing the fluid from the inlet past the filter to the outlet, a microwave energy source for subjecting the fluid to microwaves, said housing being formed by a fluid-impervious wall interposed between the microwave source and the filter and constructed of a material that has at most a low absorption capacity for the microwave, a casing surrounding the housing, wherein said filter is separated from said casing and said microwave energy source by said housing, and a waveguide associated with the casing for directing the microwave from the microwave source to the fluid flowing between the inlet and the outlet.

12. A filter apparatus according to claim 11 wherein the wall has an outer side and an inner side, and wherein the filter is disposed on the inner side of the wall.

13. A filter apparatus according to claim 11 wherein the wall has an outer side and an inner side, and wherein the filter is arranged adjacent the inner side of the wall.

* * * * *

UNITED STATES PATENT AND TRADEMARK OFFICE
CERTIFICATE OF CORRECTION

PATENT NO. : 7,357,858 B2  Page 1 of 1
APPLICATION NO. : 10/828145
DATED : April 15, 2008
INVENTOR(S) : Reto Schoeb It is certified that error appears in the above-identified patent and that said Letters Patent is hereby corrected as shown below:

On the title page, item [30], under FOREIGN PATENT DOCUMENTS:

please change:

"FR 2809786"

to:

--FR 2809766--

Signed and Sealed this

First Day of July, 2008

JON W. DUDAS
*Director of the United States Patent and Trademark Office*